United States Patent [19]

Guttag

[11] Patent Number: 4,521,853
[45] Date of Patent: Jun. 4, 1985

[54] SECURE MICROPROCESSOR/MICROCOMPUTER WITH SECURED MEMORY

[75] Inventor: Karl M. Guttag, Houston, Tex.

[73] Assignee: Texas Instruments Incorporated, Dallas, Tex.

[21] Appl. No.: 393,956

[22] Filed: Jun. 30, 1982

[51] Int. Cl.³ .............................................. G06F 11/00
[52] U.S. Cl. .................................................. 364/200
[58] Field of Search ....................... 364/200, 900, 706

[56] References Cited

U.S. PATENT DOCUMENTS

| | | | |
|---|---|---|---|
| 3,742,458 | 6/1973 | Inoue et al. | 364/200 |
| 3,827,029 | 7/1974 | Schlotterer et al. | 364/200 |
| 3,920,976 | 11/1975 | Christensen et al. | 364/200 |
| 4,120,030 | 10/1978 | Stone | 364/200 |
| 4,139,893 | 2/1979 | Poland | 364/706 |
| 4,168,396 | 9/1979 | Best | 364/900 |
| 4,215,421 | 7/1980 | Giraud | 364/900 |
| 4,278,837 | 7/1981 | Best | 364/900 |
| 4,315,311 | 2/1982 | Causse et al. | 364/200 |
| 4,319,079 | 3/1982 | Best | 178/22.05 |
| 4,403,284 | 9/1983 | Sacarisen et al. | 364/200 |
| 4,430,709 | 2/1984 | Schleupen | 364/200 |
| 4,454,594 | 6/1984 | Heffron et al. | 364/900 |

Primary Examiner—Thomas M. Heckler
Assistant Examiner—Daniel K. Dorsey
Attorney, Agent, or Firm—Robert D. Marshall, Jr.; N. Rhys Merrett; Melvin Sharp

[57] ABSTRACT

A digital processing device fabricated on a single semiconductor substrate includes an electrically programmable memory, a random access memory, a central processing unit, all connected by an information transfer bus. An external interface is provided connected to the information transfer bus to provide information contained on the bus to external devices. At least one security bit is provided to determine the status of data stored in the nonvolatile memory and portions of the random access memory. An external interface inhibit circuit is connected to the external interface. Address logic is connected to the information transfer bus to determine when information contained in the electrically programmable memory or the random access memory is being accessed. The address logic also determines the security status of information stored in the selected portions of the random access memory and the electrically programmable memory. In addition, the address logic is connected to the central processing unit to determine when an instruction operand is being fetched. The address logic is also connected to the external interface inhibit circuit to inhibit the operation of the external interface when an instruction operand is being fetched from the electrically programmable memory or selected portions of the random access memory.

3 Claims, 4 Drawing Figures

SECURE MICROPROCESSOR/MICROCOMPUTER WITH SECURED MEMORY

RELATED CASES

Related patent applications to the present application include Ser. No. 393,955, Ser. No. 393,954 and Ser. No. 393,957.

BACKGROUND

1. Field of the Invention

This invention is related to digital processing system architecture and more specifically to the protection of information stored in digital processing systems.

2. Description of the Prior Art

In the past, the development of computer programs for computers has been an extensive and time consuming task. The developers of computer programs recover the cost of such development by selling the programs. However, this is difficult to accomplish if the programs can be easily copied and used in the computer without paying the program developers.

One system of protecting programs is disclosed in U.S. Pat. No. 4,139,893 entitled "Calculator Program Security System" by Sidney W. Poland and assigned to Texas Instruments Incorporated. This patent discloses a technique that disables the downloading of a program stored in a read only memory used in a calculator. A security word or bit is located in the read only memory and if a bit in the security word is set, the calculator will not download the contents of the read only memory. Obviously, one properly skilled could circumvent this security method by using a device that does not read the security bit or react to the security bit being set and just downloads the read only memory.

Another approach to computer protection is contained in U.S. Pat. No. 4,168,396 entitled "Microprocessor for Executing Enciphered Programs" by Robert M. Best. This patent discloses a cryptographic microprocessor that includes real time enciphering and deciphering circuitry in the microprocessor itself. Another patent, U.S. Pat. No. 4,278,837 entitled "Crypto Microprocessor for Executing Enciphered Programs" also by Robert M. Best discloses variations of the cryptographic microprocessor architecture. A third patent by Robert M. Best, U.S. Pat. No. 4,319,079 entitled "Crypto Microprocessor Using Block Cipher" also discloses techniques for use in crypotgraphic microprocessors. While these techniques using enciphering do accomplish a degree of security, a special microprocessor device including hardware dedicated solely to enciphering and deciphering is required. In addition, the microprocessor device as disclosed do not include internal program memory.

Another approach is described in U.S. Pat. No. 4,120,030 by Jon Stone. In this approach, a conventional microprocessor is used except that the data memory has the data addresses transform such that the data addresses are effectively scrambled and can be unscrambled by the microprocessor in execution. While all these previously mentioned techniques provide software protection, the invention disclosed herein provides software protection for on-chip memory microcomputing devices that are interfaced to external peripheral devices.

SUMMARY

In accordance with the present invention, a digital processing device fabricated on a single semiconductor substrate is provided that includes an electrically programmable memory for the storage of data and instructions that define operations on the data. In addition, a temporary storage memory is provided for temporary storage of data and instructions. A central processor is also provided that is connected to an information transfer bus. The information transfer bus is also connected to the electrically programmable memory and temporary storage memory. An external interface is provide that is connected to the information transfer bus to provide information on the bus to external device. At least one security bit is provided for determining the security status of the information stored in the electrically programmable memory and selected portions of the temporary storage memory. An external interface inhibit circuit is connected to the external interface and is also connected to the address logic. The address logic is also connected to the information bus and the central processing unit. The address logic determines when information from the electrically programmable memory or selected portions of temporary storage memory are being accessed. In addition, the address logic is connected to the security bit. The address logic determines the status of the information being accessed from the temporary storage memory or electrically programmable memory. The address logic is additionally connected to the central processing unit to determine when an instruction operand fetch is being made. The address logic determines the security status of the information being fetched from the electrically programmable memory or the temporary storage memory and selectively inhibits the external interface accordingly.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings wherein:

DETAILED DESCRIPTION OF THE PREFERRED EMBODIMENT

This invention is for microcomputer or microprocessor chips that have on chip memory. The purpose of this invention is to prevent the examination of on chip memory by external (off chip) devices.

These microcomputer chips usually include an address bus and a data bus consisting of several parallel lines for the transfer of information. Some microcomputer chips may multiplex (time share) both address and data information on the same bus. This invention is applicable of both types and generally to any type of microcomputer chip that includes an external interface that could provide information as to the contents of the on chip memory.

This embodiment is implemented with a computer system that includes both on chip and off chip memory. The off chip memory is accessed by an on chip central processing unit (CPU) via the same data and address an address buses as accesses the on chip memory. In the normal execution of instructions, without consideration of security, the CPU cannot differentiate between on chip and off chip memory access. This type of computer architecture is fairly common in recent microcomputer systems. An example of such a computer architecture is contained in U.S. patent application Ser. No. 210,109 entitled, "Microprocessor with Strip Layout of Buses ALU. and Registers" by Kevin C. McDonough, and Karl M. Guttag which is herein incorporated by reference. Security problems arise with such a system since a program in off chip memory can enable an intelligent programmer to read or dump the on chip memory. This security requirement is also important when the programmer is writing into an on chip nonvolatile memory such as an electrically programmable read only memory (EPROM), a program which is desired to be kept confidential.

Figure 1:
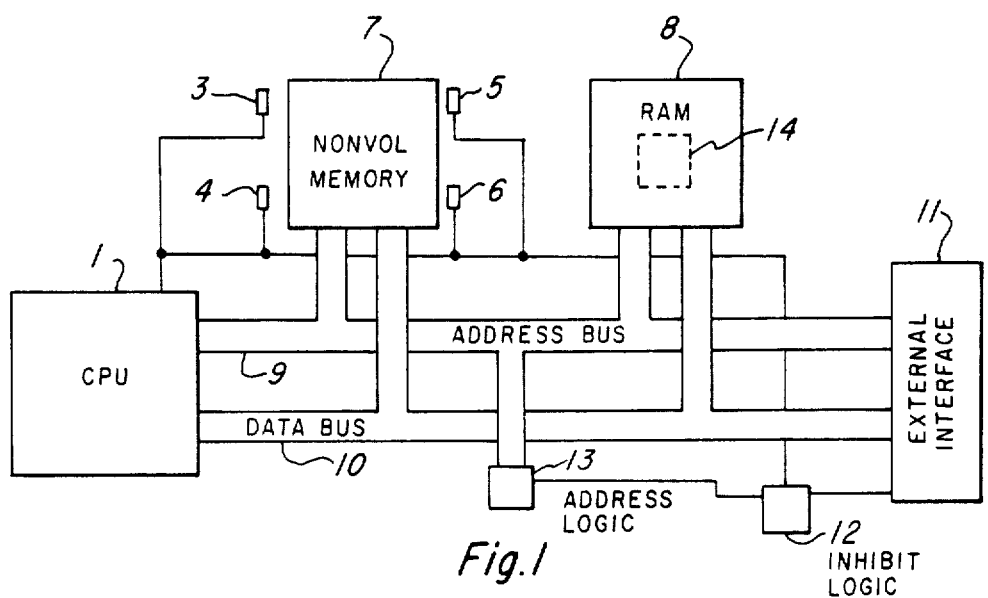
FIG. 1 is a block diagram of a computer architecture illustrating the placement of programmable security bit adjacent to a nonvolatile memory connected to an information bus.

A version of this invention is illustrated in FIG. 1. FIG. 1 is a block diagram of a microcomputer chip containing programmable nonvolatile memory 7 and random access memory (RAM) 8 connected to a CPU 1 via an address bus 9 and data bus 10. The address bus 9 and data bus 10 are also connected to an external interface 11 containing line drivers to transmit and receive address and data information from external devices. It is customary for this external interface 11 to include logic to enable a handshaking or interface protocol to other peripherals. Adjacent to nonvolatile memory 7 are guard bits 3, 4, 5 and 6. These guard bits 3, 4, 5 and 6 may be programmed by the CPU 1 and protect information contained in nonvolatile memory 7. In addition, a portion of the RAM 8 may also be protected. This is shown symbolically in FIG. 1 as the area 14 shown as the subset of the RAM 8. This protected subset may be as large as the RAM itself. Also provided for security purposes is address logic 13 connected to the address bus 9. This logic together with the guard bits 3, 4, 5 and 6 are inputted to external interface inhibit logic 12 that controls the interface 11. The external inhibit logic 12 enables and disables the external interface 11 such that when the interface 11 is disabled, the external devices connected to external interface 11 will not be able to access information that is contained on the address bus 9 and data bus 10. When the external interface 11 is enabled, however, the external devices connected to the address bus 9 and data bus 10 are able to communicate with both buses. This invention protects the information contained in the nonvolatile memory 7 and RAM area 14 by determining when instructions from these protected areas in the memory 7 or RAM area 14 are being accessed. This is the function of the address logic 13. When instructions or data from the protected area are being accessed, the address logic 13 will provide an input to the inhibit logic 12. When the protected memory is accessed and the guard bit is set, then the interface 11 is disabled such that neither the address or data appears to any external device connected to the external interface 11. Address logic 13 monitors the address bus 9. The address bus is inputted to decoding circuitry to detect when information in either the memory 7 or the restricted area of RAM 14 is being addressed. This decoding circuitry can include an array of individual logic gates, input states or a programmed logic array to detect certain input states. Additional versatility can be achieved by using storage capability in the address logic 13 to store ranges of protected addresses together with comparison logic to detect addresses on the address bus 9 within the proteced range. The external interface inhibit logic 12 will also receive inputs from the guard bits 3, 4, 5 and 6. This information is "ANDed" to determine if the external interface 11 should be disabled. Specifically, in the preferred embodiment, the guard bits 3, 4 5 and 6 are "ORed" and this result is "ANDed" with the output from the address logic 13. Therefore, if a protected area in memory is accessed, then the external interface inhibit logic 12 examine the protect bits. If any of the protect bits are set, then the external interface 11 is disabled preventing any access to on chip memory by an external device. If, of course, an external device is addressed, then the address logic 13 will not provide an input to the external interface inhibit logic 12 and the external interface 11 will be enabled to allow the CPU 1 to read and write from the external peripheral.

While the preferred embodiment includes an address and data bus connected to an external device, this protection technique is applicable to a microcomputer without expandable memory space off chip.

While four of the programmable guard bits or "lock bits" are shown as bit locations 3, 4, 5 and 6, any number of such bits can be placed in locations in or adjacent to the nonvolatile memory 7. In the early stages of the computer chip development, these bits were not programmed (remaining 0) in order to allow the program developers to read and to write all locations of protected memory by an external device (i.e., a development system or testing the device in production). Once the program contained on the clip in erasable nonvolatile memory 7 had been developed, the "lock bits" or "guard bits" 3, 4, 5 and 6 are programmed to prevent access to the nonvolatile memory 7 and protected RAM 14 by an external user. The bits 3, 4, 5 and 6 can be erased. However, in the process of erasing, the whole will be erased. Since the guard bits 3, 4, 5 and 6 are "ORed", if any single lock bit is set, then the inhibit logic 12 will disable the external interface 11, preventing access to the nonvolatile memory 7 and protected RAM 14. Therefore all of the guard bits must be erased without erasing any nonvolatile. These guard bits 3, 4, 5 and 6 can be located to ensure that the total nonvolatile memory 7 must be erased in order to gain access to the nonvolatile memory 7. A metal cover for these bit locations can be fabricated over the bit locations during manufacture of the chip to prevent the erasure of thse guard bit locations 3, 4, 5 and 6. Therefore, once these bits are set, they always remain set and even though the memory can be erased, it cannot be accessed by the external interface 11. The setting of these guard bits 3, 4, 5 and 6, can be accomplished by either the execution of an instruction in the CPU 1 or by exercising on chip control logic. Once these guard bits are set, then protection is provided for the on chip software. By protecting only a portion of the RAM 8, such as protected area 1, the remaining part of RAM 8 may be used by CPU 1 as a scratch pad for software being executed from and external peripheral through the external interface 11.

This allows greater versatility for the on chip CPU 1 in executing external software.

The above invention has been disclosed implemented in a computer architecture that provided off chip access to the address and data buses. However, it should be apparent to one skilled in the art that external devices need not access the address and data buses to determine what software is contained in the on chip memory. By clever manipulation of on chip memory and the on chip CPU, an intelligent programmer may be able to determine the contents of the on chip memory by observing the chip output ports. The invention as disclosed using the guard bits and protected address logic serves to prevent the disclosure of the protected on chip software by selectively preventing the output of information when the CPU is performing a set of instructions involving access to on chip memory.

Figure 2:
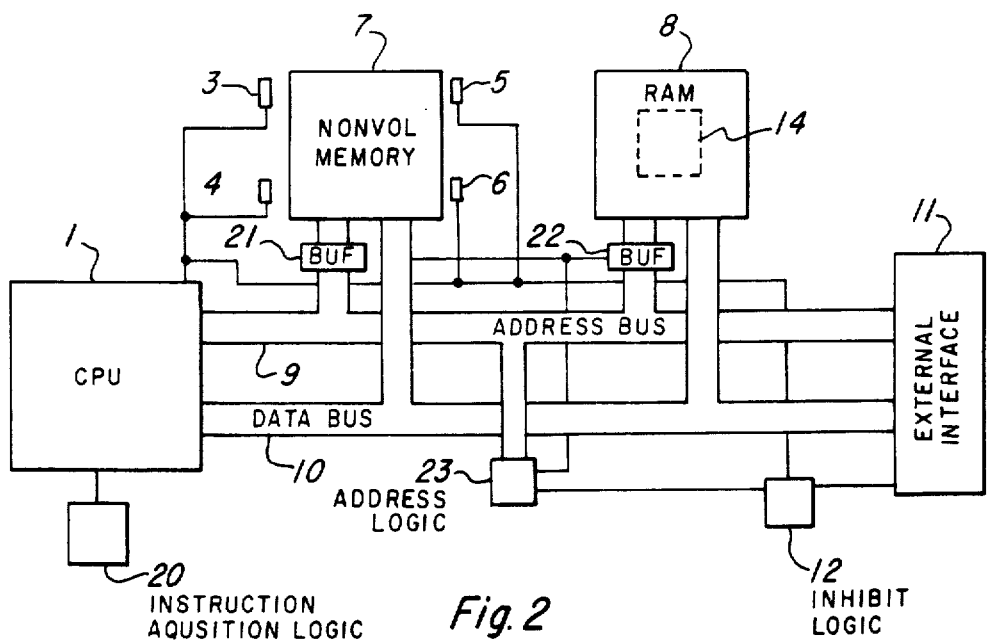
FIG. 2 is a block diagram of a digital processing system illustrating inhibit interfaces located between the information bus, nonvolatile memory and a temporary storage memory.

Another architecture that provides software security is illustrated in FIG. 2. FIG. 2 contains a similiar architecture to FIG. 1 in that the CPU 1 is connected via a data bus 10 and address bus 9 to two internal memories, including an memory 7 and RAM 8. Guard bits 3, 4, 5 and 6 are adjacent to memory 7. In addition the address bus 9 and data bus 10 are connected to an external interface 11 which provides the address and data information to external peripherals connected to the computer chip. Address logic 23 is attached to the address bus 9. Instruction acquisition logic 20 is attached to the CPU 1. Disabling buffers 21 for the memory and 22 for the RAM are attached to the address bus 9 interface to the memory 7 and RAM 8, respectively. Inhibit logic 12 for the external interface 11 is attached as shown in FIG. 1. The instruction acquisition logic 20 determines when an instruction acquisition is taking place by monitoring the microcode of the CPU 1. The instruction acquisition logic 20 can consist of decode logic to determine when the CPU 1 is fetching an instruction or can consist of a latch connected to a microcode signal that designates an instruction fetch. An example control signal is IAQ as described in the patent application previously referenced (patent application Ser. No. 210,109). Logic 20 when determining that an instruction acquisition is taking place, provides a signal to disabling logic blocks 21, 22 and 12. The guard bits are also inputted to disabling logic blocks 21, 22 and 12. This instruction acquisition signal is ANDed in the disabling logic blocks 21, 22 and inhibit logic 12 with a signal from the address logic 23. Address logic 23 is similiar to address logic 13 except that address logic 23 provides an input to inhibit logic blocks 12, 21 and 22 when an off chip memory location is being addressed or when on chip protected memory is being accessed. If an instruction is being fetched from off chip, then the memory interface disable logic 21 and RAM disable logic 22 disables access to the memory 7 or a portion of the RAM 8 by the external instruction preventing off chip instructions from including accessing on chip protected memory. Additionally, if an instruction from protected memory 7 or protected RAM 14 is accessed, the instruction acquisition signal from logic 20 and the address logic 23 is ANDed with the guard bits 3, 4, 5 and 6 in inhibit logic 12 to inhibit the external interface 11 while the instruction is on the data bus 10. This prevents peripheral circuitry from viewing what instructions are being accessed from protected memory.

Figure 3:
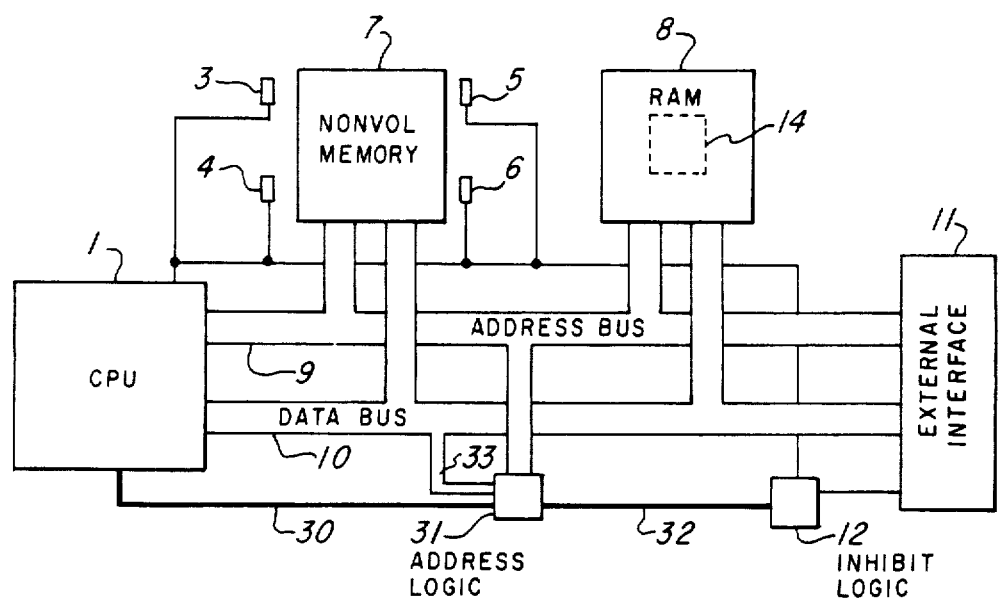
FIG. 3 is a block diagram of a digital processing system illustrating the nonvolatile memory connected to an information bus that is connected to address logic to maintain the security status of information on the information bus.

A further security configuration is illustrated in FIG. 3. In this configuration, the CPU 1 is connected to an memory 7 and a RAM 8 via data bus 10 and address bus 9. In addition the address bus 9 and data bus 10 are connected to the external interface 11 which is controlled by external interface inhibit logic 12. Also connected to the address bus 9 is address logic 31. Guard bits 3, 4, 5 and 6 are located adjacent to the memory 7. In addition the invention allows a selected area of RAM symbolized by area 14 in RAM 8 to be protected. In this configuration, when a protected instruction is accessed from the memory 7 or protected RAM area 14, and the guard bits 3, 4, 5 and 6 are set, the external interface is disabled during any operation that allows access to this data on the address bus 9 and data bus 10. The address logic 31 monitors the CPU 1 via line 30 to determine when the source operand and destination operand are being fetched. This address logic 31 examines the address of the source operand and the destination operand to determine if either the source destination operand or destination operand originates from a protected memory area. If the operand is obtained from a protected area and the guard bits 3, 4, 5 and 6 are set, the inhibit logic 12 disables the external interface 11 for the address bus 9 and data bus 10 to prevent an external device from determining what the instruction operands are. In addition, a latch is set in inhibit logic 12 to continually disable the external interface 11 while the operation on the protected data is taking place. In addition, this data can be tagged. This can be accomplished by the address logic 31 setting an additional bit in memory for that operand when that operand is stored in a nonprotected memory. Therefore when this data is read from an unprotected memory, it contains the additional bit which tags it as protected data which causes the address logic 31 to generate a disable command over line 32 to the inhibit logic 12. The address logic 31 monitors the data bus 10 via line 33 to determine when tagged data is being accessed. When the tag bit is set for data, the latch in inhibit logic 12 is set. This latch is reset when protection is no longer being processed by CPU 1. In this manner, the data stored in memory 7 and selected portions of RAM memory 8 can be protected continually through the operations involving this data and furthermore, data which derives from the computation of protected data will become protected data and be secure from external examination. The tagged memory is a versatile protection scheme. Only memory that is tagged is protected (i.e. forces an inhibit of access) and untagged memory is not protected. The protection of memory is therefore a function of the program requiring protected memory.

Another variation of the tagged data protection technique involves the determination of the origin of the source and destination operands for each instruction. If the tag of either operand is set then the result of the instruction execution will be tagged and protected. The address logic 31 monitors the fetch of operands over the data bus 10 via line 33 as before. When either the source or destination operand is tagged, the CPU 1 will tag the result causing the inhibit logic 12 to disable the external interface 11 when the results are being stored. It should be noted that this tag technique does not require guard bits 3, 4, 5 and 6. Since the tag of each word in memory designates the security status, this variation allows for dynamic protected memory allocation. This feature is advantageous in programs where the requirements for protected or unprotected memory vary widely during program execution.

Figure 4:
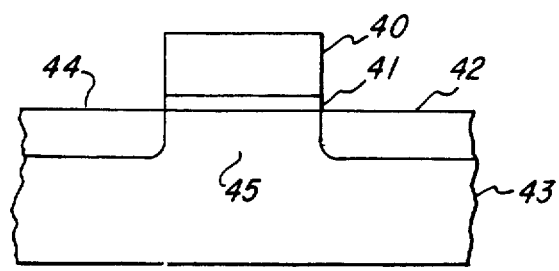
FIG. 4 is a cross sectional view of a simple field effect transistor illustrating the channel region.

A mechanism that can be used to secure data stored in a ROM is illustrated by FIG. 4. FIG. 4 illustrates a simple metal oxide silicon field effect transistor (or insulated gate field effect transistor) including a gate area 40 placed above a gate oxide insulator 41 which is located between a source 42 and drain 44 on a semiconductor substrate 43. The area 45 between the source and drain and directly underneath the gate and gate insulator is normally considered to be the channel of the field effect transistor. This is, when the gate 40 becomes properly charged, a channel develops in area 45 allowing current flow between the source 42 and drain 44. A method of implanting described in U.S. Pat. No. 4,230,504 entitled "Method of Making Implant Programmable N Channel ROMs" can be used to inhibit a current flow between source and drain during normal operation of the field effect transistor. In other words, when the gate 40 is turned on, there will be no current conduction through the channel in area 45. Therefore, even though the gate 40 is present and turned on, the field effect transistor is off. Exterior examination of the field effect transistor cannot determine whether the field effect transistor device has been implanted by such a method. Therefore if a ROM is fabricated using such a technique, it is very difficult for someone other than the manufacturer to determine what the actual status of the ROM is by examining it physically. Of course, this is not to say that someone could not take the ROM apart and by using chemical analysis and probing, determine which of the field effect transistors have been so implanted. However, to do so is so expensive as to be prohibitive. Therefore, this technique can be used in programming on chip ROMs to prevent external examination of these ROMs by someone other than the manufacturer. Using this technique with the previously discussed configurations would prevent both the physical examination of the ROM and the interrogation of the ROM using the on chip data and address buses. It should be noted that this technique, of course, is not applicable to EPROMs since EPROMs are electrically programmable and invisible on physical examination. However, this technique is applicable to manufactured ROMs that are not alterable.

The implant method can be used in manufacturing the ROM that contains the microcode for a computer chip. Such a computer configuration is described in U.S. Pat. application Ser. No. 253,644 entitled "Self-Emulator Microcomputer" by Robert C. Thaden et al herein incorporated by reference. This application describes a computer configuration that contains boh a program memory ROM and a control ROM. The program memory ROM contains the instructions for the program to be executed by the computer and is analogous to the EPROM 7 in FIGS. 1, 2 and 3. However, in addition this computer configuration described also includes a control ROM. The control ROM is used to decode the instructions contained in the program ROM into control signals which controls the operation of the central processing unit internal components. By fabricating both the program memory ROM and control ROM of such a computer chip using the implant through polysilicon technique, the onboard software program in the program memory ROM will be protected even though one might be able to find the contents of the actual ROM itself. Without knowing the microcode implementation (i.e., the instructions set for the computer) the actual program contents remains unknown. If this technique is combined with the other techniques including guard bits and instruction and data protection as previously described, the determination of the on chip program becomes extremely difficult if not impossible.

In addition to the above implementations, it should be apparent to one skilled in the art that these configurations can be used in combination with each other or with other protection techniques to provide software security. One embodiment would combine the guard bit configuration with the use of enciphered software stored externally. The software stored internally would decipher the external software and store the deciphered software in the internal RAM. The CPU then executes all the deciphered software stored internally. Besides deciphering, the internally stored nonvolatile memory may include interpretive software to interpret a higher order level language software stored externally. The interpreted programs are stored on the on chip RAM to be executed by the on chip CPU.

What we claim is:

1. A data processing device formed on a single semiconductor substrate comprising:

a central processing means for performing data processing operations upon data in accordance with instructions, said data processing operations including at least one memory access operation for recall of data or an instruction stored in a specified address location;

a nonvolatile memory means having a plurality of address locations which are a first subset of the possible address locations of said at least one memory access operation, for storing data and instructions which define data processing operations at respective address locations;

a temporary read-write memory means having a plurality of address locations which are a second subset of the possible address locations, said second subset including a secure set of address locations, for temporarily storing data and instructions which define data processing operations at respective address locations;

an information transfer means connected to said central processing means, said nonvolatile memory means and said temporary read-write memory means for transfer of data and instructions;

an external interface means connected to said information transfer means for providing information to at least one device external to said single semiconductor substrate;

at least one security bit memory means disposed in proximity to said nonvolatile memory means, each for storing therein a single bit of data indicating a secure state when said nonvolatile memory means and said secure subset of memory locations of said temporary read-write memory means is to be secure or a nonsecure state;

address logic means connected to said central processing means, said information transfer means and said at least one security bit memory means for generating a security signal when said security bit memory means indicates a secure state and said central processing means is performing a data processing operation in accordance with an instruction including a memory access operation to recall data as an operand which is stored in either said nonvolatile memory means and or in said secure set of address locations of said temporary read-write memory means; and an external interface inhibit means connected to said external interface means and said address logic means for inhibiting the transfer of data and instructions to the external device via said external interface means upon reception of said security signal.

2. A data processing device according to claim 1, wherein said at least one security bit memory means is programmable.

3. A data processing device according to claim 2, wherein said address logic does not generate said security signal when said central processing means is performing a data processing operation in accordance with an instruction including a memory access operation to recall data as an operand which is stored in an address location within said second subset of address locations but not included in said secure set of address locations, whereby said data may be accessed by said at least one external device via said external interface means.

* * * * *